Aug. 17, 1965 G. MERZ 3,201,768

MAGNETIC CORE MATRIX STORAGE SYSTEMS

Original Filed Jan. 21, 1959 2 Sheets-Sheet 1

INVENTOR.
G. MERZ

INVENTOR.
G. MERZ

United States Patent Office 3,201,768
Patented Aug. 17, 1965

3,201,768

MAGNETIC CORE MATRIX STORAGE SYSTEMS

Gerhard Merz, Rommelshausen, Germany, assignor to International Standard Electric Corporation, New York, N.Y., a corporation of Delaware Original application Jan. 21, 1959, Ser. No. 788,178. Divided and this application Oct. 8, 1964, Ser. No. 392,064
Claims priority, application Germany, Feb. 7, 1958, St 13,425
2 Claims. (Cl. 340—174)

This invention relates to storage systems and in particular to buffer storage systems using magnetic core matrices. It is a division of a copending application entitled "Magnetic-Core Storage Matrix, in Particular for Buffer Storages in Telecommunication-Technical Switching Systems," Serial No. 788,178 filed by the inventor herein on January 21, 1959 and assigned to the assignee of this application.

Figure 1:
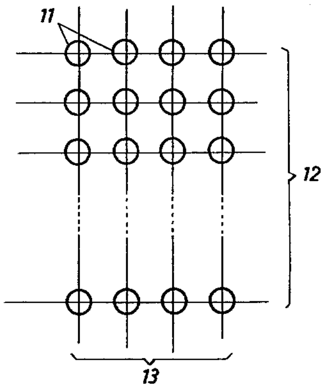
Figure 2:
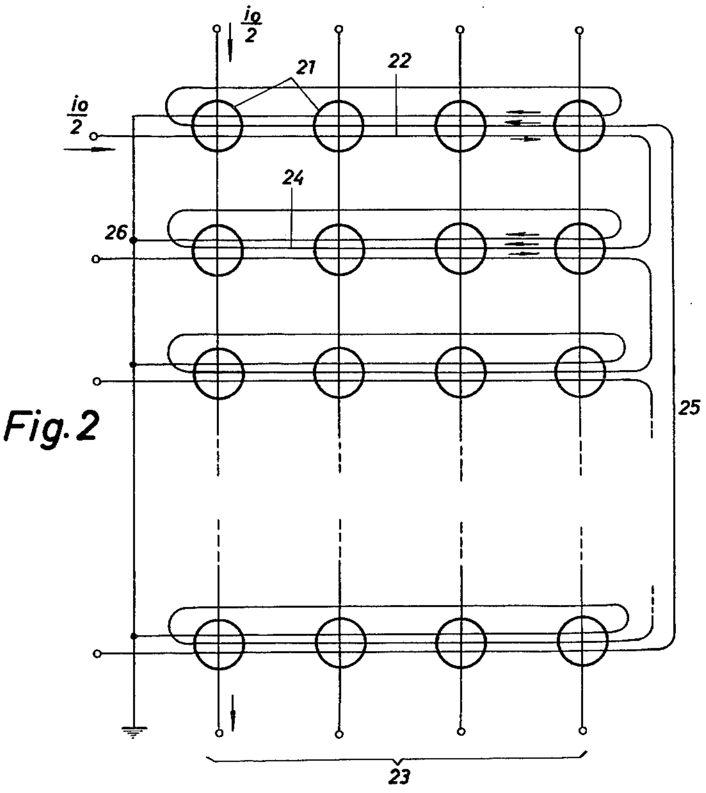

In the accompanying drawings there is shown:

In FIG 1, a conventional type of magnetic-core storage matrix,

In FIG. 2, a magnetic-core storage matrix according to the invention, and

Figure 3:
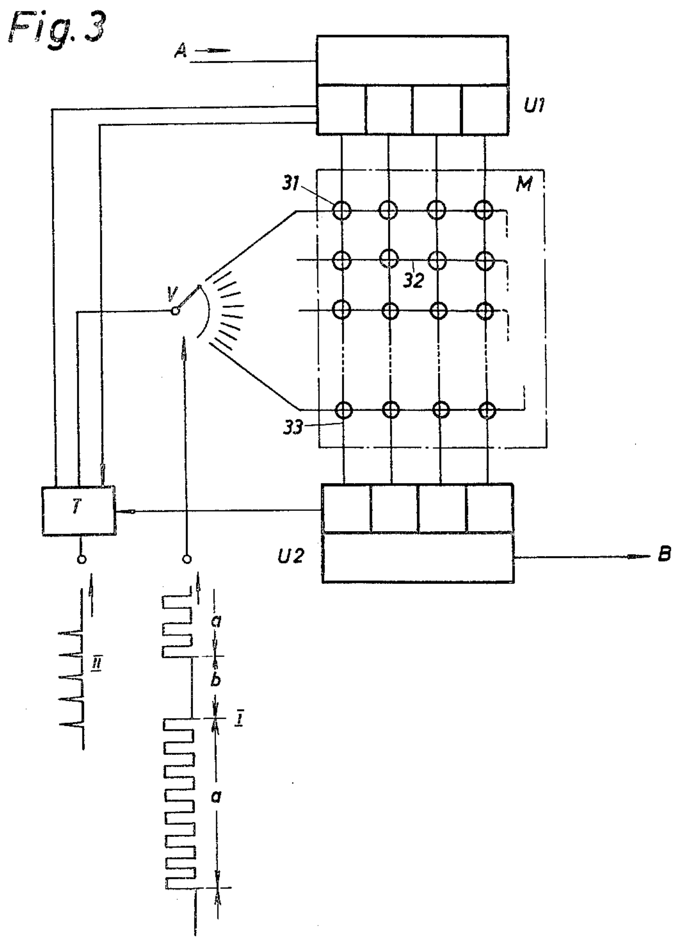

In FIG. 3, an example of practical employment of a magnetic-core storage matrix according to the invention.

A storage device which is used in the above mentioned manner merely as a buffer storage is, for example, adapted to store informations arriving in any possible or even irregular rhythm, and to transfer such informations in the same order of succession, but in a different rhythm upon request.

To this end it has already become known to use parallel storage devices, of which one is schematically shown in FIG. 1 of the accompanying drawings. In this type of storage device or register, the binary digits representing a binary number, are in common recorded on or read from, the lines 12. The number of binary digits per line, which are characterized by a yes-no-position, amounts to about 4–7, and respectively corresponds to a binary number or a signal in one of the customary codes. The number of lines may be adapted to the respective requirements and may lie accordingly between 10 and 500.

As is well known, cores (FIG. 1, 11) consisting of a ferromagnetic material with an approximately rectangular characteristic are used in such storage devices. When denoting the current by $i_0$ at which a core 11 will just change from its one magnetic condition to the other one and the current by $i_{0/2}$ at which the present condition would be maintained, the process of recording the information to the storage device is performed in such a way that current pulses $i_{0/2}$ are not only applied to that particular line into which the information is supposed to be recorded, but also to those particular columns 13, whose cores are supposed to be marked within this line. For the reading-out purpose, the line 12 to be read is acted upon by a current pulse whose amplitude $\geqq i_0$ and the sign of which is opposite to that used in the writing in or recording process.

In the hitherto conventional methods, centralized pulse generators are used for generating the writing or reading pulses for the lines 12. These pulses are transferred via gating circuits, such as transistors or magnetic cores, to the lines 12 of the storage matrix. The equipment and devices which are necessary to this end are generally very expensive, especially for the connecting through of the read-in current pulses, whose amplitude is generally relatively high. Especially in the case of small types of storage devices, considerable investment is required for the common devices.

For the purpose of reducing this investment in circuitry, the invention provides a magnetic-core storage matrix, preferably for the use in intermediate or buffer storages in switching systems of telecommunication exchanges, arranged in such a way that the wires or conductors of the lines respectively pass through the cores of the next line, or of one of the next lines, either twice or several times in the reversed sense, and in this arrangement the first line of the matrix is reckoned as following after the last one in a cyclical succession.

One exemplified embodiment relating to such an arrangement is shown in FIG. 2 of the accompanying drawings. The magnetic-cores 21 of ferromagnetic material with a rectangular characteristic are arranged in the form of a matrix. In the present example each row comprirses four cores, corresponding to a binary recording of four binary digits per binary number. The wires or conductors 23 extending through the columns are arranged in the conventional manner. On the other hand, the wires 22 of the individual lines are conducted in such a way that they pass at first, in a predetermined sense, e.g. from the left-hand side towards the right-hand side, through the cores of the line and are thereafter looped to the next successive line in, e.g. two or more loops 24, in the reverse sense, viz., from the right-hand side towards the left-hand side. The outputs 26 thereof are then conducted in common to ground. This kind of displacement is repeated in all of the lines in such a way that the wire coming from the line input of the $n$th line at first runs through the cores of this line and is looped thereafter in the opposite sense twice or more times through the cores of the $(n+1)$th line. From the last line the wire coming from the line input is looped back via 25 towards the first line, in order to pass twice or more times through the cores in the opposite sense.

Now when transferring a pulse with the amplitude $i_{0/2}$ to a predetermined line, those cores within this line whose column inputs are supplied with a pulse of just the same size or amplitude are caused to change into the other magnetic condition. At the same time, and by the same line pulse just characterizing or marking the line to be acted upon, the cores in the next line with twice or more the number of turns or windings wound in the opposite direction and which have accidently assumed the operating condition are partially or fully restored depending on the number of turns. Accordingly, the next line is fundamentally ready to receive a new recording In this way, and by employing only a single kind of pulse, it is possible to carry out the write-in as well as the read-out operation. Since for the read-out operation, the same wires assigned to the individual columns are used as output wires for the write-in operation the two processes, of course, are not performed simultaneously. In fact, both the write-in and read-out operations can be controlled alternately.

The substantial advantage of the inventive arrangement is to be seen in the fact that for both operations a single group or kind of line pulse is required by means of which, in small types of storage devices, a saving of switching means can be achieved which is rather considerable when compared with the total expense. To this there is to be added the further advantage that also the control output for the gating circuit is lower for the read-out operation, e.g. corresponding to that of the switching transistor.

Of course, the arrangement can also be such that the wires 22 extending through the lines are not led through the cores of the following line, but one or more lines are skipped. Accordingly, the wire extending from the input of the $n$th line will then not be looped via the $(n+1)$th line, but will be looped further via the $(n+m)$th lines. In this case, of course, in counting further after reaching the last line of the matrix, counting is continued with the first line.

With reference to FIG. 3 of the accompanying drawings, one exemplified embodiment relating to the practical application of such a type of matrix according to the invention, will now be briefly described. First of all, it is pointed out that informations of any kind arriving in any irregular rhythm, are supposed to be converted into informations of a different kind which, in turn, are read in a likewise irregular succession differing from the rhythm of the incoming informations. This is the problem, for example, whenever sequences of digits which are transferred by means of a key selection have to be correspondingly evaluated for the employment with a system operating with trains of pulses. The informations as arriving from A and represented, for example, by a voltage code, are then converted by the converting device U1 into a binary code. Upon arrival, the individual informations are successively stored in the individual lines of the matrix storage device M, and, when required, are requested in turn by the converter U2, for being transferred, for example, in the shape of pulse chains, towards B. The matrix is composed, in the manner as already described with reference to FIG. 2, of the magnetic-cores 31, in which case the wires 33 extending through the columns are used on one hand for the writing-in of the information from U1 and, on the other hand, for reading-out towards U2. The individual wires 32, corresponding to the lines, which respectively pass through the cores of the next successive line twice or more times in the opposite direction, in a manner shown in FIG. 2, are connected in a regular cycle, via a distributor V, to the pulse generator. The distributor V which, for reasons of simplicity, is shown in FIG. 3 like a rotary selector, consists of gating circuits, e.g. of gating or switching transistors. The stepping-on of the distributor is effected by chains of pulses A, between which there is inserted a somewhat longer interval. The number of pulses of each chain of pulses corresponds to the number of lines. If a writing-in is performed in one line, then the distributor will receive an additional pulse so that its switching cycle will now start with the following row (line). In this way, the read-out times *a* and the write-in times *b* are respectively determined by means of the pulse chains and the interval lying between them, in a rhythm which is independent of the storage request, as well as the read-out instruction.

With respect to the write-in and read-out operations, the pulses II which are fed via the gating circuit T to the distributor V are delivered by a generator which has not been shown. The gating circuit T is controlled by the converters U1 and U2 in such a way that the path for the pulses II is blocked during the read-out times *a*, as long as the converter U2 is seized by the transmission of a train of pulses. As soon as this path becomes free, the pulses II will be permitted to pass during the read-out time *a*. This is effected in such a way that after the stepping-on of the distributor V, at least one read-out pulse is transferred to the line. As soon as the distributor has been switched to a line preceding a line containing an information, this information will be transferred to U2, because the pulse in this following line passes through a wire that is several times looped through the cores in the reversed direction of passage. It will effect the magnetic restoring of the cores, and cause the transfer of an induced pulse upon the corresponding wires 33. As soon as the information contents have been transferred to U2, the latter will effect the new blocking of the gating circuit.

On the other hand, in the presence of a storage request, that is, after the arrival of an information from A at U1, the gating circuit T will be affected from there during the write-in time *b* in such a way that the line which is just at the end of the reading cycle, which is the next successive free line, will receive a pulse II, likewise the converter U1. The columns which are connected by the converter U1 in accordance with the desired binary digits, likewise receive a pulse II at the same time. In this way, the information to be transmitted is stored at the desired points of the matrix in a binary code.

While I have described above the principles of my invention in connection with specific apparatus, it is to be clearly understood that this description is made only by way of example and not as a limitation to the scope of my invention as set forth in the objects thereof and in the accompanying claims.

I claim:

1. A buffer storage system for temporarily storing incoming information comprising a magnetic core storage matrix arranged in columns and rows, each of said cores having a first and a second stable state, primary winding means interconnecting all of the cores in each of said columns, secondary winding means interconnecting all of the cores in each of said rows, and tertiary winding means interconnecting all of the cores in each of said rows and connected to the secondary winding but being opposite in direction to said secondary winding means, said tertiary winding means having at least twice as many turns as said secondary winding means, distributor means operated responsive to timing pulses to cyclically connect to said secondary winding, binary converter means operated responsive to said incoming information to selectively connect to said primary winding means, gating means normally transmitting operating pulses through said distributor means and said secondary winding means to said tertiary winding means to drive said cores to said first stable state, means operated responsive to the connection of said binary converter means to said selected primary winding for transmitting said operating pulses to said selected primary winding means to drive said cores simultaneously receiving said operating pulses over said primary and secondary winding means to said second stable state, and means connected to said primary windings for reading out stored information by detecting the change of cores from said second to said first stable state.

2. A buffer storage system for temporarily storing information and for periodically reading-out said stored information comprising square hysterisis loop magnetic core matrix means wherein said cores are arranged in columns and rows, each of said cores having a first stable magnetic state when no information is stored therein and a second stable magnetic state when information is stored therein, winding means associated with said cores, said winding means comprising a primary winding serially connecting each of said cores in each of said columns, a secondary winding serially connecting each of said cores in each of said rows, a tertiary winding serially connected to each secondary winding, said tertiary winding being serially connected to all of the cores in the row succeeding said row having said serially connected secondary winding, said tertiary winding further having at least twice as many turns as said secondary winding, distributor means cyclically connected to each of said secondary windings, responsive to timing pulses for transmitting operating pulses through said secondary and tertiary windings, binary converter means operated responsive to incoming information for selectively transmitting operating pulses through said primary windings, said operating pulses having a value whereby the simultaneous receipt of said operating pulses in the primary and secondary winding of a core are required to drive said core from said first stable magnetic state to said second stable magnetic state and the exclusive receipt of an operating pulse in said tertiary winding drives said core from said second to said first stable magnetic state, and read-out means including said primary winding operated responsive to any of said cores changing from said second stable magnetic state to said first magnetic stable state for providing output pulses.

References Cited by the Examiner

UNITED STATES PATENTS

| | | | |
|---|---|---|---|
| 2,708,267 | 5/55 | Weidenhammer | 340—174 |
| 2,948,885 | 8/60 | Stuart-Williams | 340—174 |
| 3,112,470 | 11/63 | Barrett | 340—174 |

IRVING L. SRAGOW, *Primary Examiner.*

BERNARD KONICK, *Examiner.*